US007185938B2

United States Patent
Beck

(10) Patent No.: US 7,185,938 B2
(45) Date of Patent: Mar. 6, 2007

(54) FUEL DOOR HOUSING FOR AUTOMOBILES

(75) Inventor: Christian Beck, Röttingen (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 52 days.

(21) Appl. No.: 11/068,434

(22) Filed: Mar. 1, 2005

(65) Prior Publication Data

US 2005/0194810 A1   Sep. 8, 2005

(30) Foreign Application Priority Data

Mar. 3, 2004   (DE) ............... 10 2004 010 294

(51) Int. Cl.
 *B62D 25/00* (2006.01)
(52) U.S. Cl. .................... 296/97.22; 292/207
(58) Field of Classification Search ............. 296/155, 296/97.22; 292/207, 198
 See application file for complete search history.

(56) References Cited

U.S. PATENT DOCUMENTS

| 4,525,004 | A |   | 6/1985 | Tanaka et al. |          |
|-----------|---|---|--------|---------------|----------|
| 5,664,811 | A |   | 9/1997 | Martus et al. |          |
| 5,769,481 | A | * | 6/1998 | Cooper ........ | 296/97.22 |
| 6,352,295 | B1 | * | 3/2002 | Leitner ........ | 296/97.22 |
| 6,554,344 | B2 | * | 4/2003 | Son ............ | 296/97.22 |
| 2003/0222476 | A1 |   | 12/2003 | Park |          |

FOREIGN PATENT DOCUMENTS

| DE | 10026841 A1 | 12/2001 |
| DE | 203 11 149  | 11/2003 |
| EP | 0273525 A2  | 7/1988  |

* cited by examiner

*Primary Examiner*—Lori L. Coletta
(74) *Attorney, Agent, or Firm*—Lowe Hauptman & Berner, LLP

(57) ABSTRACT

A fuel door housing for the fueling of an automobile including a tub-like body, a flap which is hingely linked to the body, a thrust spring biasing the flap toward an opened position, a locking element having a locking and an unlocking position, and an actuating element for placing the locking element into the unlocking position. The locking element is moved towards the unlocking position through a one-way transmission of the actuating element upon a movement of the flap into its closed position or beyond thereof, respectively, and the locking element completely engages the catching element upon arrival of the flap at its closed position. A casing is formed at the inner side of the body. The locking element and parts of the actuating elements are accommodated by the casing, and a locking portion of the locking element is sealingly extended through a wall portion of the casing facing the catching element.

18 Claims, 2 Drawing Sheets

FUEL DOOR HOUSING FOR AUTOMOBILES

RELATED APPLICATIONS

The present application is based on, and claims priority from, German Application Number 10 2004 010 294.5, filed Mar. 3, 2004, the disclosure of which is hereby incorporated by reference herein in its entirety.

FIELD OF THE INVENTION

The invention relates to a fuel door housing for automobiles according to the preamble of claim 1.

BACKGROUND OF THE INVENTION

It is known to terminate the conduit leading to a fuel tank of an automobile in a fuel door housing and to close the conduit leading to the tank by means of a rotating closure. Located on the fuel door housing is a pivot bearing for a flap which can be secured by means of a locking- or lock system. If the lock is deactivated, for example a transverse bolt pulled out of a locking projection, the flap can be opened.

SUMMARY OF THE INVENTION

It is further known to move the flap by means of a spring into a small opening from which it can then be easily opened by hand. It is further known to use a so-called push-push system in which the flap is either completely or slightly pivoted open, if the flap is firstly pressed inwardly by hand and a locking means, which normally locks the flap, is in the unlocking position. The unlocking position is, for example, achieved by the actuation of the central locking of the automobile. Alternatively, the locking means can also be unlocked by separate manual actuation, for example with the aid of a cable means, which is actuated via an actuation element in the interior of the automobile.

It is further known to use a tub-like body for the flap which is inserted in a correspondingly formed opening in the automobile body, for example via a latching connection. The flap is attached to the body via a suitable hinge. The locking device is generally attached to the exterior of the body and a suitable locking element, for example a locking bolt or the like, passes into its interior via an opening in the side wall of the body, in order to cooperate with a catch means on the back side of the flap. So that the flap can be pivoted open, it is necessary to move the locking element into the unlocking position. Nowadays, there is often insufficient space in automobiles to attach the locking device to a suitable point outside the body. At the very least the design of the assembly is very awkward and costly. A further disadvantage is that an interface is formed between the locking means for the fuel door housing, which means is generally accommodated in a suitable casing, and the flap. When assembling the locking element, it is difficult to align the flap sufficiently precisely with the catch means.

The object of the invention is to produce a fuel door housing in which the assembly costs are lower and the assembly, including the locking means, can take place externally. Moreover, the size of the components used is to be reduced.

This object is achieved by the features of claim 1.

According to the invention, the casing for the locking means is formed on the inner face by means of wall portions formed integrally on the body, and inside of which the locking element and components of the actuation device are supported. A locking portion of the locking element is sealingly extended through a wall portion facing the catch means.

In the invention, the flap lock is incorporated in the fuel door housing. The locking means is accommodated in a space which is separated off from the interior of the fuel door housing and which includes a wall portion through which the locking element is sealingly extended. The locking element can, for example, be a slider or a linearly moveable pin or even a locking hook. Preferably such a lock is arranged on the face of the body lying opposite the hinge. By arranging the locking means within the fuel door housing, assembly costs are lower, not least because external assembly is possible. Furthermore, the size of the components is reduced relative to conventional solutions. Regarding the assembly, it is also advantageous that the locking means and the fuel door housing do not have to be subsequently aligned as the locking means is already prefitted in the fuel door housing. Consequently, the locking means is a component of the prefabricated hybrid component. It is therefore not necessary to assemble the locking means and the fuel door housing when it is fitted in the automobile.

It is conceivable to extend the locking element sealingly through an opening in the wall portion. This design can cause wear and in addition, to dampness and dirt nevertheless penetrating the casing of the locking means. As a result, an embodiment of the invention provides that the locking element and the wall portion are interconnected and the wall portion is designed such that it follows the movement of the locking element. Thus the wall portion can be of membrane- or bellows-shaped construction and can therefore follow the movement of the locking element. Nevertheless, the interior of the casing is sealed at all times. A further embodiment of the invention provides that the wall portion itself is formed of elastomeric material or is connected to an adjacent wall portion of elastomeric material. The locking element can also therefore be moved together with the wall portion. This embodiment requires, however, that the wall portion is manufactured in a two-component injection moulding process which, however, with current injection moulding technology, does not pose any problems.

According to a further embodiment of the invention the wall portion is part of a lid-shaped portion, separately formed, being adapted to sealingly close an opening of the casing facing upwardly or laterally. The casing, which receives components of the locking means within the fuel door housing body must naturally allow the fitting of these parts which, for example, can take place through the disclosed opening. However, the opening has to be subsequently closed. This takes place via the separate lid-shaped portion which, for example, can be latched into the opening.

The wall portion, according to a further embodiment of the invention can have a depression directed toward the bottom of the body, the catch portion engaging the depression and the catch portion having a catch opening which is engaged by the locking portion of the locking element.

As already mentioned, the locking element can be formed from a linearly movable locking pin and from a pivotable locking hook which is pivotally supported between the ends, one end including the locking portion and the other being connected to the actuation means.

The actuation means can, for example, include a cable means which, through a one-way transmission, engages the locking element. The cable means is, for example, actuated via an actuating element within the automobile and moves the locking element out of engagement with the catch means. A thrust spring which engages the flap, can then pivot it about a smaller angle in the direction of the open position, so that the user can grasp the flap and completely open it. By spring preload the locking element returns again to the locking position. If the flap is then pressed shut by hand, the locking element can be pivoted partially into the unlocking position by ramped surfaces sliding over one another, a one-way transmission between the locking element and the cable means ensuring that this movement is possible. In principle, however, such a principle is known.

Alternatively, the actuation means can be formed from an electromotoric or electric magnetic drive, on the inner face of the wall portion a switching element being arranged for a switch activating the drive which is actuable by a projection on the back side of the flap through the movable wall portion. The projection can, for example be formed from the catch means of the flap. If the flap is firstly pressed inwardly by the user according to the push-push principle beyond the closed position, the switch is actuated. This switches on the drive motor or an electric magnet if, for example, at the same time the central locking is locked. After this, the motor or the electric magnet then displaces the locking element into the unlocking position, whereby the flap is pivoted at this point by spring preload into a partially or completely opened open position. The locking element is subsequently displaced again into the locking position, whereby closing the flap for a time produces a pivoting or moving of the locking element in the direction of the unlocking position, as already disclosed above.

BRIEF DESCRIPTION OF THE DRAWINGS

Finally, it is also conceivable to provide a possibility of mechanical/electrical actuation by a linearly movable rejection element, which can be displaced by the flap when pushed in, if a locking magnet is unlocked. As a result, a curve element which can be actuated by the rejection element is coupled to the locking element so that the thrust spring impinging on the rejection element produces a movement of the locking element into the unlocking position.

The invention is to be described further hereinafter with reference to the embodiments shown in the drawings, in which.

DETAILED DESCRIPTION OF PREFERRED EMBODIMENTS

Figure 1:
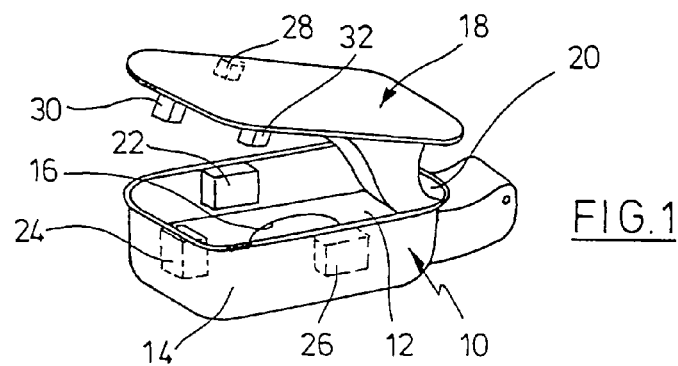
FIG. 1 shows a perspective, diagrammatic view of a fuel door housing according to the invention.

A fuel door housing 10 is illustrated diagrammatically in FIG. 1 which includes a bottom 12 and side walls 14. The bottom has an opening 16 for connecting a conduit leading to a tank, not shown, to the tank of the automobile, not shown. A flap 18 is hinged to the fuel door housing 10 via a hinge 20. The flap 18 and fuel door housing 10 can be of conventional design.

In FIG. 1 three casings 22, 24, 26 are illustrated which, on the inner face of the side wall 14 of the body 10, are substantially integrally formed therewith from a suitable plastics material. The casings 22 to 26 can be optionally provided. Naturally, a single lock is sufficient. Preferably the casing 24 is used, which lies opposite the hinge 20. In the casings 22 to 26 a locking element, not shown, is supported which cooperates with a catch means 28, 30 and 32 on the back side of the flap 18 when the flap is closed.

Figure 2:
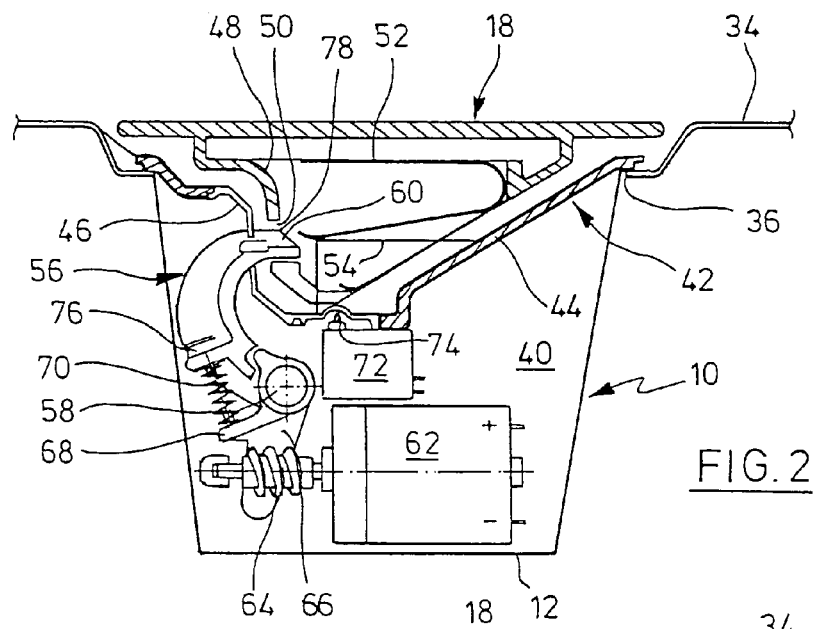
FIG. 2 shows a section through the fuel door housing according to FIG. 1 in the region of a locking means with a motorised actuation of the locking element.
Figure 3:
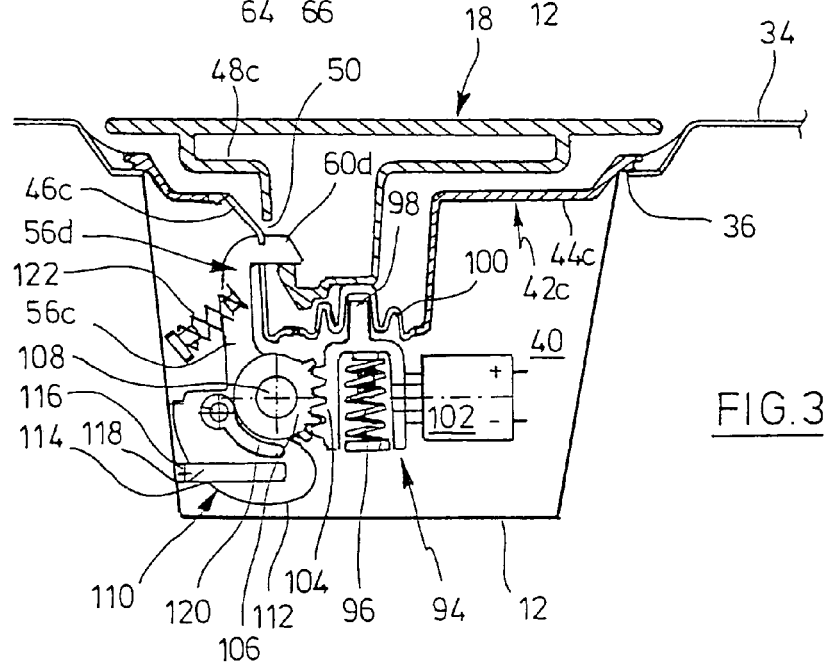
FIG. 3 shows a further embodiment, similar to FIG. 2, but with a substantially mechanical actuation of the locking element.
Figure 4:
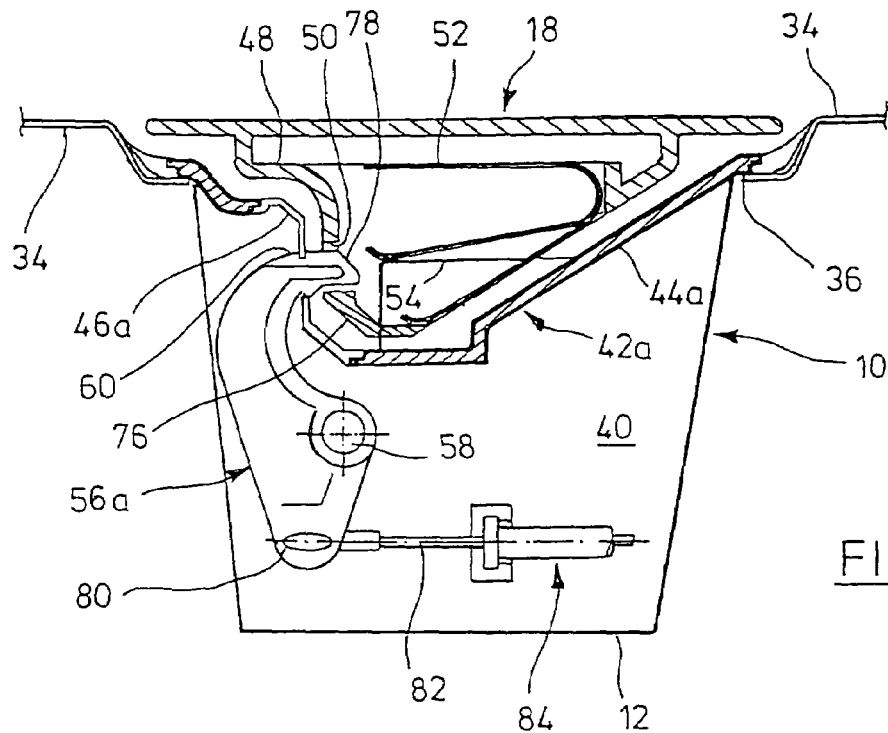
FIG. 4 shows a third embodiment of an actuation of the locking element.

FIGS. 2 to 4 illustrate what can be supported within the casings 22 to 26 to lock the flap 18 in the closed position. Where similar components are used in FIGS. 2 to 5, they are provided with the same reference numerals.

In FIGS. 2 to 5 a component of the body panel 34 of an automobile, not shown, can be seen with an opening 36 into which the body 10 is inserted and to which it is attached. The attachment is not shown here for reasons of simplicity. Furthermore, FIGS. 2 to 5 show what is visible when viewed for example from the left side of the casing 24 in FIG. 1, when the side wall of the body 10 facing it is imagined.

In FIG. 2 a space 40 is formed in the casing which, from the drawing plane, is defined by the side wall 14 and on the opposing side below the drawing plane is defined by a wall, not shown. Above, the space 40 is defined by a lid-shaped portion 42. In this manner the space 40 is almost sealingly closed off from the interior of the body 10. The lid-shaped portion 42 is, for example, formed separately from plastics whilst the remaining wall portions of the casing 24 are manufactured integrally with the body 10. The fastening of the lid-shaped portion 42 is not shown in detail. For this, a latching connection can, for example, be used. It is also conceivable to form the portion 42 integrally with the other components and to hinge it via a film hinge.

The lid-shaped portion 42 made from plastics is formed from two different materials. The portion 44, in solid lines, is formed from a relatively hard material, whilst the portion 46 shown in two parallel lines is formed from an elastomer. On the back side of the flap 18 a catch portion 48, which is approximately V-shaped in side view, is formed which includes a catch opening 50 in a portion extending approximately perpendicular to the flap 18. A hairpin-like spring 52 supports itself with one arm on a base 54 of the lid-shaped wall portion 42 and with the other arm on the underside of the flap 18 and biases it in the open position.

In the space 40 a locking hook 56 is pivotally supported about a bearing pin 58. A locking portion 60 of the locking hook 56 extends through the elastomeric portion 46 of the lid-shaped portion 42 into the catch opening 50. The connection between the locking portion 60 and the wall portion 46 is such that the locking hook 56 can pivot, the wall portion 46 following this movement. In the space 40 an electric motor 62 is furthermore arranged which, for example, is connected to a suitable DC power source. Its shaft includes a threaded spindle portion 64, which cooperates with a threaded nut 66, whose lateral extension is also rotatably supported on the bearing pin 58. Between a further lateral extension 68 of the threaded nut 66 and a counter bearing face of the locking hook 56 facing it, a thrust spring 70 is arranged. A switch 72 for the motor 62 has a switch element 74 which faces the elastomeric wall portion 46. A lower portion of the catch portion 58 bears approximately against the wall portion 46 above the switch element 74. If the flap 18 is pressed in the direction of the space 40, the switch element 74 is actuated, the switch closed and the motor 62 set in motion, provided that a control device, not shown, indicates that the actuation is desired, for example when unlocking the locks of the automobile via central locking. When actuating the motor 62 the nut 66 is pivoted anticlockwise, a positive engagement between the locking hook 56 and the part of the nut 66 facing it ensuring that the locking hook 56 is also pivoted anticlockwise against the spring 70 and, as a result, comes out of engagement with the catch opening 50. Consequently, the spring 52 can pivot the flap 18 by a specific amount in the direction of the open position, whereby the user can grasp the flap and completely pivot it into the open position. A short time later the motor is actuated in the opposite direction, whereby the locking hook 56 is again pivoted into the locking position. If the flap 18 is again manually pivoted into the closed position by the user, a ramped portion 76 of the catch portion 58 slides on the ramped portion 78 on the upper face of the locking hook 56 and pivots it against the spring 70 in the direction of the unlocking position, until the locking portion 60 of the locking hook 56 can engage in the catch opening 50.

In the embodiment according to FIG. 4, the locking hook 56a is designed to be double-armed and the lower arm in FIG. 4 is connected via a one-way transmission 80 to a cable 82 of a cable means shown at 84. The locking portion 60 of the locking hook 56a, similar to FIG. 2, is connected to the elastomeric wall portion 46a, whereby the latter follows the movement of the hook 56a.

If, by means of the cable 82 the locking hook 56a pivots anticlockwise, the locking portion 60 frees the catch opening 50 and the spring 52 can lift the flap 18 a little, so that the user can grasp it and pivot it up. By a suitable spring bias, not shown, the locking hook 56a is again moved into the locking position shown in FIG. 4. When closing the flap 18 the ramped surfaces 76, 78 slide over one another, so that the hook 56a can pivot a little anticlockwise relative to the cable 82 due to the one-way transmission 80, until the locking portion 60 can snap into the catch opening 50.

Figure 5:
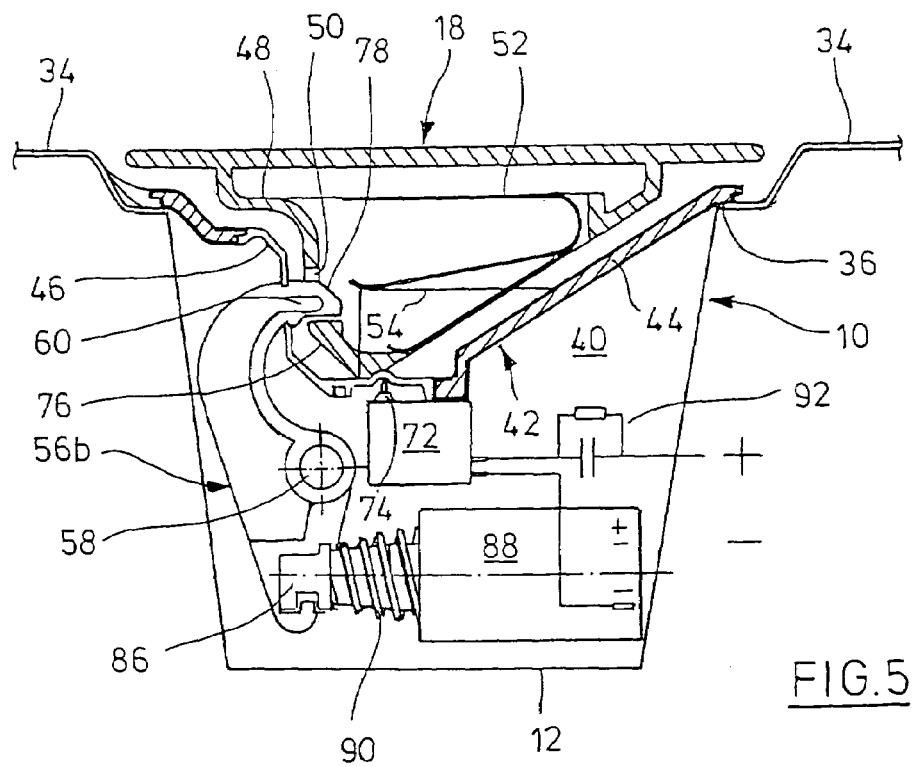
FIG. 5 shows a fourth embodiment of an actuation of the locking element.

In the embodiment according to FIG. 5, the locking hook 56b is again of double-arm construction and pivotally supported on the bearing pin 58. A pin 86 of an electric magnet is positively engaged on the lower arm. The pin 86 is biased by a thrust spring 90, so that the locking hook 56b is also biased in the locking position. An electric magnet 88 is excited by the switch 72, whose switch element 74 is similarly actuated, as is disclosed in connection with the embodiment according to FIG. 2. In the switching path between the switch 72 and the electric magnet 88 a small energy store 92 is arranged. This causes the electric magnet 88 to be deactivated again after a certain storage time, whereby the spring 90 displaces the locking hook 56b into the locking position shown in FIG. 5. When closing the flap 18 the locking hook 56b is, in the already disclosed mode of operation, temporarily deflected until the locking portion 60 can snap into the catch opening 50. The actuation of the electric magnet 88 takes place however, only when a further signal is given for unlocking, for example by unlocking the central locking of the automobile.

In the embodiment according to FIG. 3 a rejection element 94 is linearly movably arranged in the space 40, which includes a thrust spring 96 in a hollow portion, which biases the rejection element 94 upwardly. A pin-shaped projection 98 of the rejection element 94 cooperates with a bellows portion 100 of the elastomeric wall portion 46c and rests it against the associated lower face of the catch portion 48c. A locking magnet 102 which is actuated by a switch, not shown further, locks the rejection element 94 in a lower biased position.

On the outer face the rejection element 94 has a tooth rack portion 104 which meshes with a pinion 106 and which is rotatably supported on an axle 108. To the pinion a curved element 110 is fixedly attached and includes a cam curve 112 which cooperates with a cam 114 of a control lever 118 pivotally supported at 116. On the axle 108 a locking hook 56d is further pivotally supported, which with a locking portion 60d cooperates with the catch opening 50 of the catch portion 48c of the flap 18. A pawl 120 is pivotally supported on the curved element 110 and a thrust spring 122 biases the locking hook 56d in the closed position. Thus the cam 114 on the control lever 118 holds the rejection element in the lower biased position by engaging the curved element 110.

If the locking magnet 102 is unlocked, for example by central locking, at first nothing occurs, as the locking hook 56d continues to lock the flap 18. By pressing on the outside of the flap 18 the rejection element 54 is pressed slightly downwards against the pressure of the spring 96, and by the engagement of the tooth rack portion 104 and pinion 112 the pawl 120 is slightly pivoted clockwise. As a result the cam 114 of the control lever 118 is pivoted anticlockwise by the cam curve 112 and for its part pivots the pawl 120 anticlockwise. In this manner the pinion 112 and the locking hook 56d are coupled together and the rejection element 94 can on its return upwards, pivot the locking hook 56d anticlockwise, whereby the catch opening 50 is freed. As a result, the rejection element 94 is able to lift the flap 18 a little, whereby the user can grip it and completely open it.

The invention claimed is:

1. A fuel door housing for an automobile, comprising:
a hollow body of plastic material adapted to be inserted in an opening of the automobile body and which includes a bottom and side walls, the bottom having an opening or a connecting pipe for the connection to a conduit leading to a tank;
a flap which is linked to a side wall of the body though a hinge;
a thrust spring which biases the flap toward an opened position;
a locking element positioned inside said casing and movable between a locking position and an unlocking position, wherein in the locking position it cooperates with a catching element on the back side of the flap in the closed position of the flap; and
an actuating element for the locking element for placing the locking element into the unlocking position; wherein, said actuating element includes an electromagnetic drive, a switch element for activating said drive, said switch element being actuable by a projection defined by the catch portion which is formed at an arm of the hinge on the back side of the flap through the wall portion;
wherein the locking element is moved temporarily in the direction of said unlocking position upon a movement of said flap towards its closed position, and said locking element completely engages said catching element upon arrival of said flap at its closed position;
said casing is formed at an inner side of said body, said wall portion is integrally formed with said body, and a locking portion of said locking element sealingly extending through said wall portion from within said casing.

2. A fuel door housing for an automobile, comprising:
a hollow body of plastic material adapted to be inserted in an opening of the automobile body and which includes a bottom and side walls, the bottom having an opening or a connecting pipe for the connection to a conduit leading to a tank;

a flap which is linked to a side wall of the body though a hinge;

a thrust spring which biases the flap toward an opened position;

a locking element positioned inside said casing and movable between a locking position and an unlocking position, wherein in the locking position it cooperates with a catching element on the back side of the flap in a closed position of the flap; and an actuating element for the locking element for placing the locking element into the unlocking position, wherein said actuating element includes an electric motor adapted to drive a threaded spindle and a threaded nut engaging the spindle, the nut having a lateral extension which through a one way transmission cooperates with the locking element, the locking element is moved temporarily in the direction of said unlocking position upon a movement of said flap towards its closed position, and said locking element completely engages said catching element upon arrival of said flap at its closed position, wherein said casing is formed at an inner side of said body, said wall portion is integrally formed with said body, and a locking portion of said locking element sealingly extends through said wall portion from within said casing.

3. The fuel door housing of claim 2, wherein the locking element is a locking pin.

4. The fuel door housing of claim 3, wherein a pin of an electric magnet cooperates with the locking element through a one way transmission.

5. A fuel door housing for an automobile, said fuel door housing comprising:
   a hollow body adapted to be inserted in an opening of an automobile body and said hollow body including a bottom and side walls, said bottom defining an opening for connection to a conduit leading to a tank, said body containing therein;
   at least one casing having an open side;
   a wall portion sealingly closing said open side of said casing;
   a locking element positioned inside said casing and movable between a locking position and an unlocking position; and
   an actuating element for moving said locking element from the unlocking position to locking position; and
   a flap movably attached to one of said side walls of said body, said flap having catching element engageable with said locking element of said at least one casing when said locking element is in the locking position.

6. The fuel door housing of claim 5, wherein the locking element and the wall portion are interconnected and the wall portion is movable to follow the movement of the locking element.

7. The fuel door housing of claim 6, wherein the wall portion is formed of elastomeric material or is connected to an adjacent wall portion of an elastomeric material.

8. The fuel door housing of claim 5, wherein said at least one casing in the body is located on the side opposite to a hinge where the flap is attached to said body.

9. The fuel door housing of claim 1, wherein the wall portion has a depression towards the bottom of the body, and the catching element has a catch opening engageable with the locking portion of the locking element.

10. The fuel door housing of claim 5, further comprising a cable element which through a one way transmission engages the locking element for releasing and moving said locking element from the locking position.

11. The fuel door housing as claimed in claim 5, wherein the locking element is moved temporarily in the direction of said unlocking position upon a movement of said flap towards its closed position, and said locking element completely engages said catching element upon arrival of said flap at its closed position;

wherein said casing is formed at an inner side of said body, said wall portion is integrally formed with said body; and a locking portion of said locking element sealingly extending through said wall portion from within said casing.

12. The fuel door housing of claim 11, wherein the locking element is a pivotally supported locking hook, the locking hook having one arm including the locking portion and a further arm engaging the actuating element.

13. The fuel door housing of claim 12, wherein a linearly movable rejection element which is biased by a spring engages the lower side of the wall portion, an actuation portion on the back side of the flap engages the associated side of the wall portion, the rejection element being held in a biased position by a locking magnet, a linear tooth rack portion of the rejection element cooperating with a pinion which is fixedly attached to a curve element including a cam curve, a control lever is pivotally supported in the casing and has a portion which coacts with the cam curve such that upon actuation of the rejection element through a pressure on the flap the control lever is rotated and actuates a pawl whereby the pinion is coupled with a locking hook, and the locking hook is rotated into the unlocking position by the thrust spring and the flap is pivoted about a predetermined angle outwardly by the rejection element.

14. A fuel door housing as claimed in claim 7, wherein said wall portion having an upper side and a lower side, said upper side of said wall portion supports a base, said base engages a first arm of a spring that is biasing said flap away from said closed position, said spring having a second arm engaging said flap.

15. A locking mechanism for a fuel door housing for an automobile, said locking mechanism comprising:
   a hollow body adapted to be inserted in an opening of an automobile body and said hollow body including a bottom and side walls, said bottom defining an opening for connection to a conduit leading to a tank, said body containing therein;
   at least one casing having an open side;
   a wall portion sealingly closing said open side of said casing;
   a locking element positioned inside said casing and movable between a locking position and an unlocking position; and
   an actuating element for moving said locking element from the unlocking position to locking position; and
   a catching element engageable with said locking element of said at least one casing when said locking element is in the locking position, said catching element adapted to be positioned on a flap, wherein, said flap is movably attached to one of said side walls of said body.

16. A locking mechanism for a fuel door housing comprising as claimed in claim 15, wherein
   said casing is formed at an inner side of said body;
   said wall portion is integrally formed with said body and a locking portion of said locking element sealingly extending through said wall portion from within said casing; and the locking element is moved temporarily in the direction of said unlocking position upon a movement of said flap towards its closed position, and said locking element completely engages said catching element upon affival of said flap at its closed position.

17. A locking mechanism for a fuel door housing comprising as claimed in claim 16, wherein said actuating element includes an electromagnetic drive, a switch element for a switch activating said drive, said switch element being actuable by a projection defined by the catch portion which is formed at an arm of the hinge on a distal side of the flap through the wall portion.

18. A locking mechanism for a fuel door housing comprising as claimed in claim 17, wherein said actuating element includes an electric motor adapted to drive a threaded spindle and a threaded nut is engaging the spindle, the nut having a lateral extension which through a one way transmission cooperates with the locking element.

* * * * *